June 7, 1927.
H. P. FIELD
MINE CAR
Filed Jan. 14, 1926
1,631,313
5 Sheets-Sheet 1
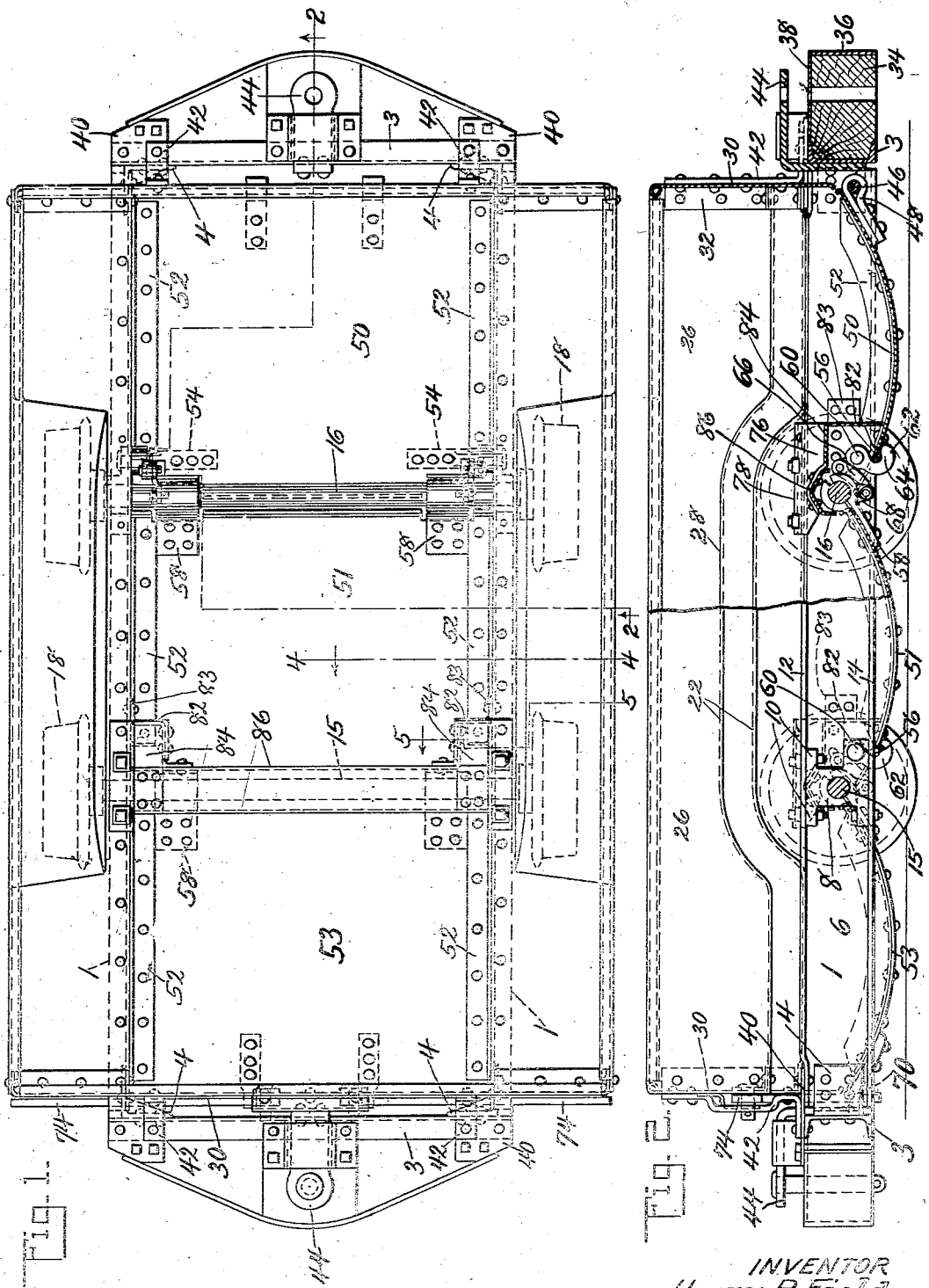
INVENTOR
Henry P. Field
BY
ATTORNEY June 7, 1927.
H. P. FIELD
MINE CAR
Filed Jan. 14, 1926
1,631,313
5 Sheets-Sheet 2
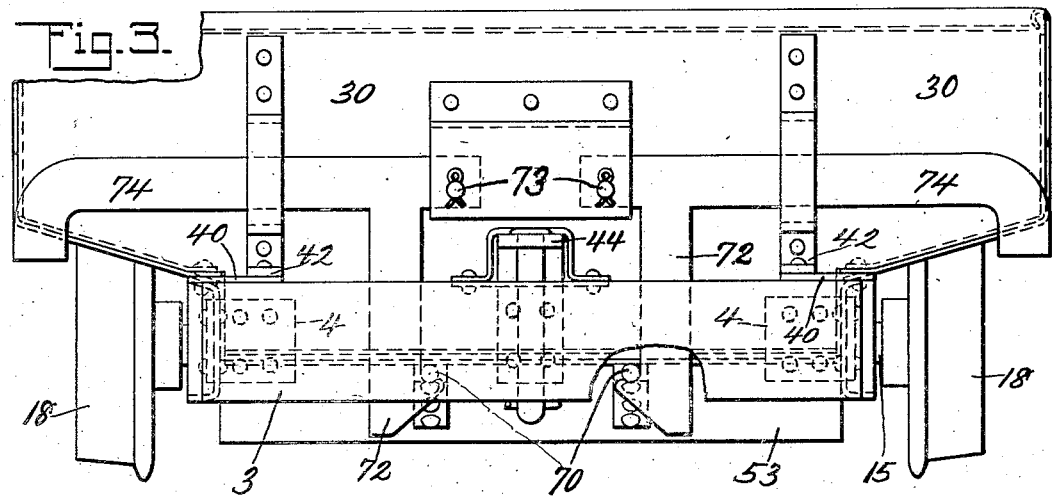
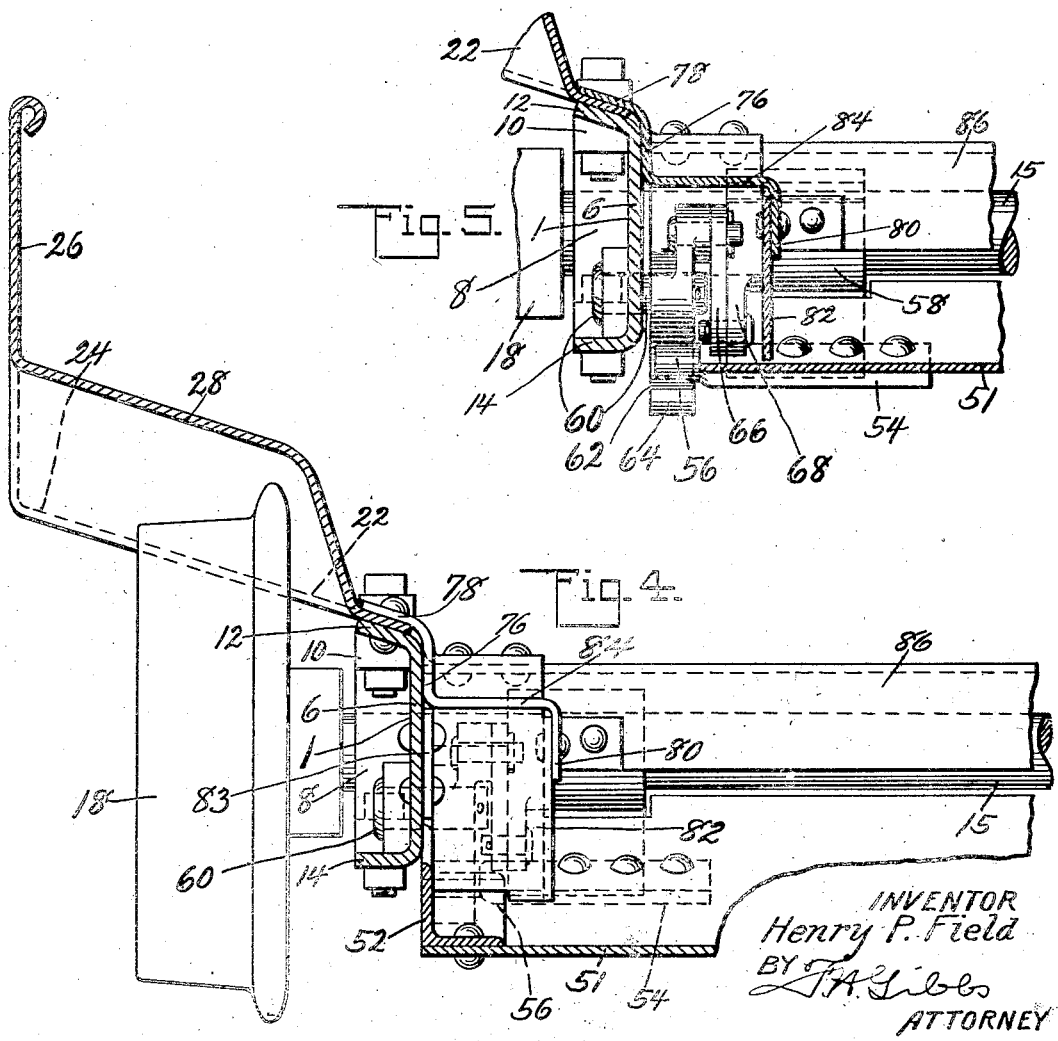
INVENTOR
Henry P. Field
BY
ATTORNEY

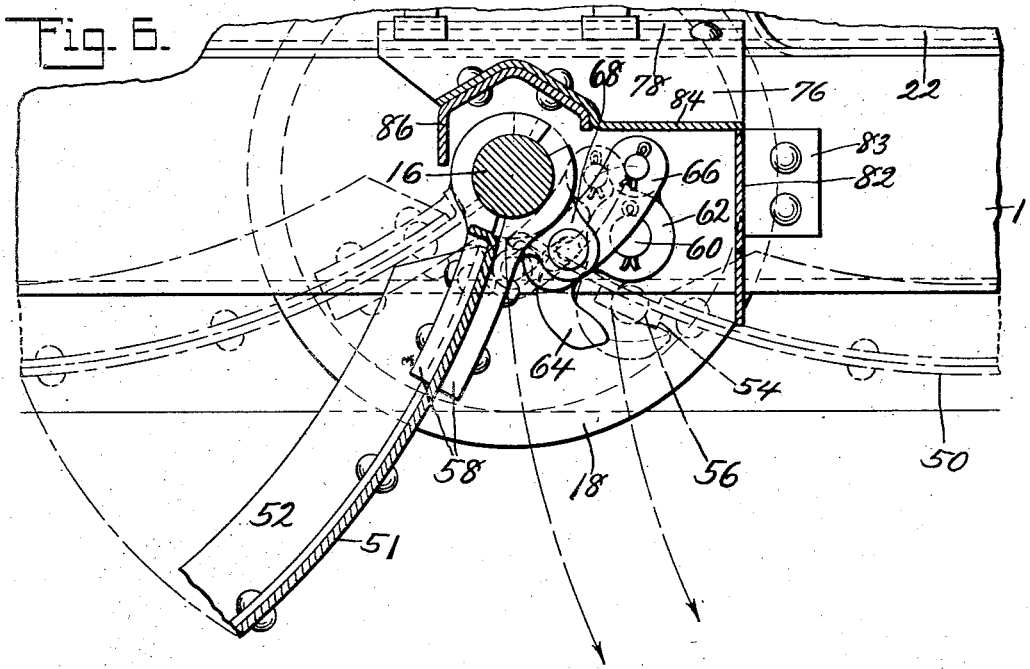
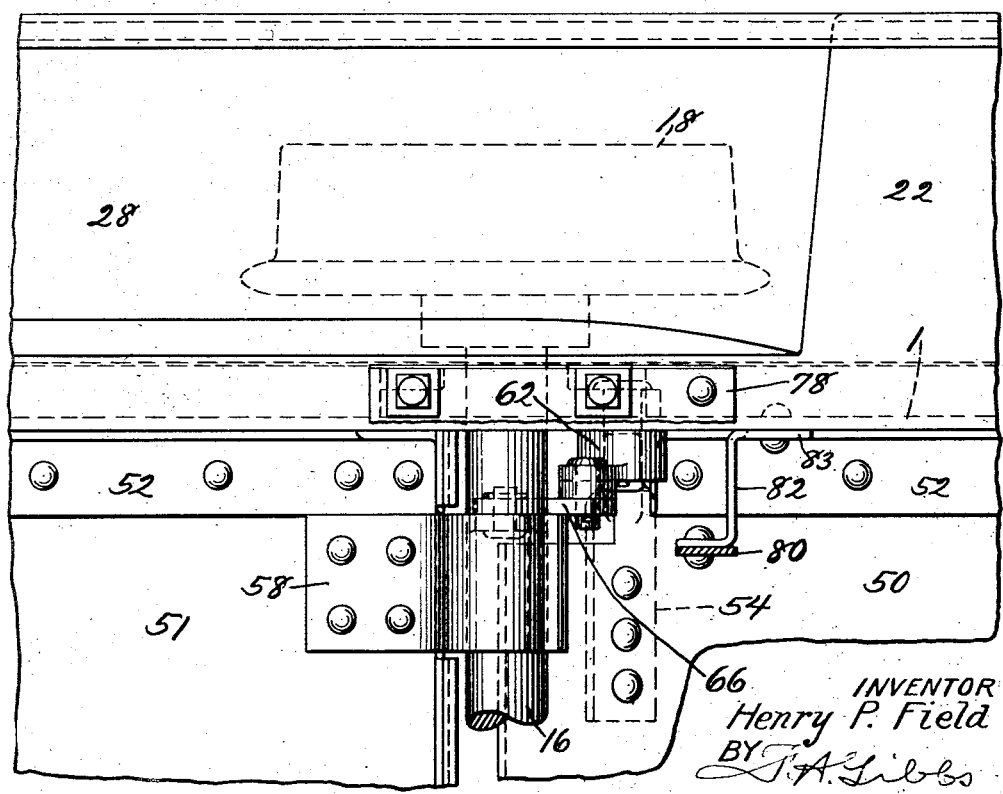

INVENTOR
Henry P. Field
BY F. H. Gibbs
ATTORNEY

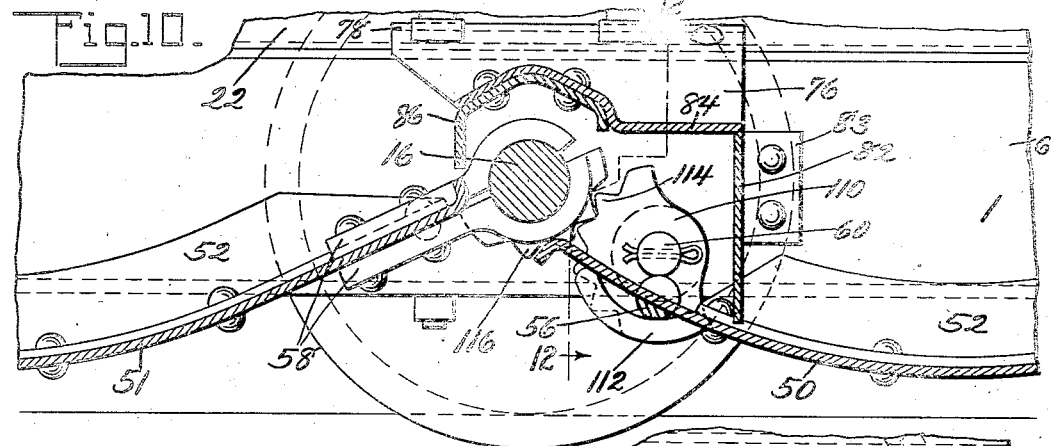
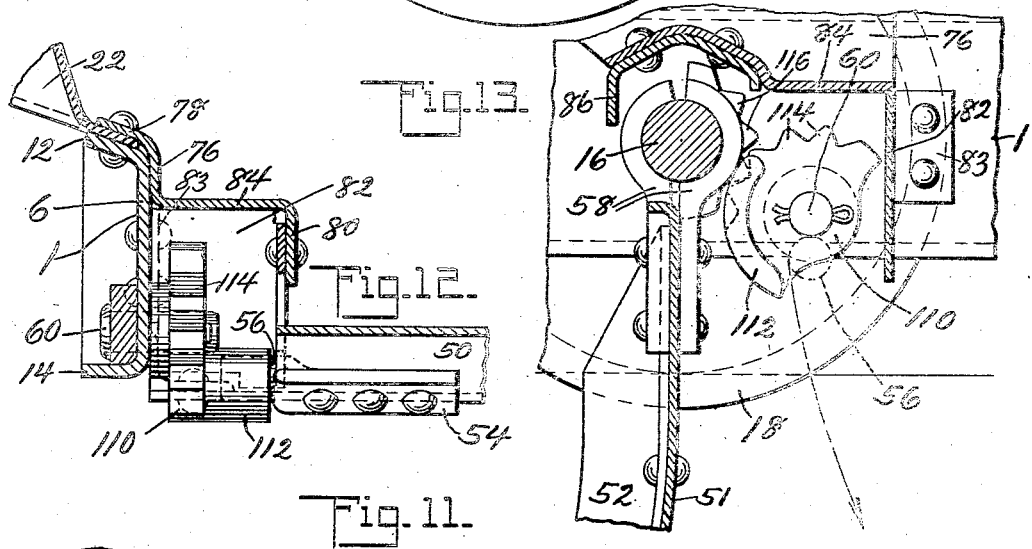
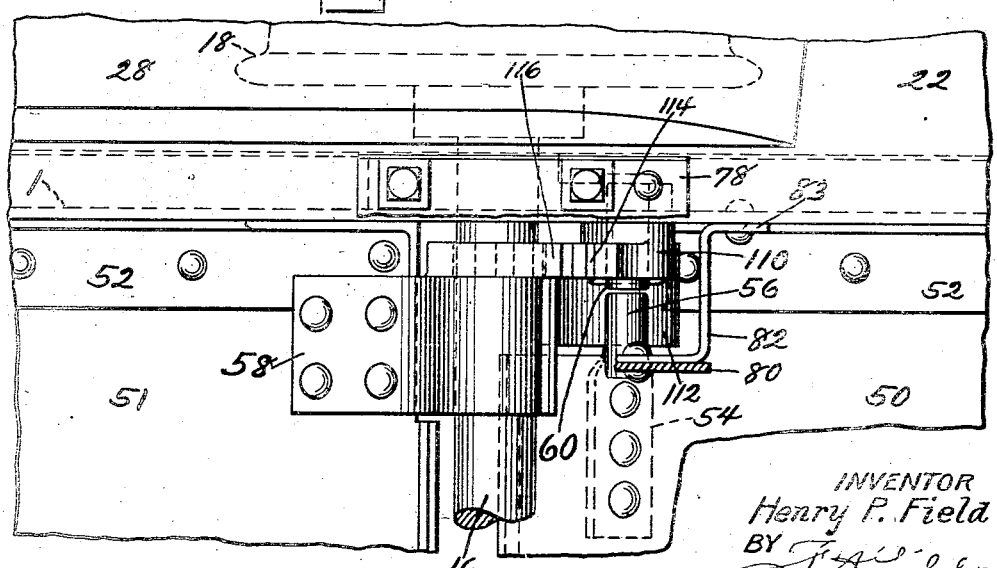

Patented June 7, 1927.

1,631,313

UNITED STATES PATENT OFFICE.

HENRY P. FIELD, OF BERWICK, PENNSYLVANIA, ASSIGNOR TO AMERICAN CAR AND FOUNDRY COMPANY, OF NEW YORK, N. Y., A CORPORATION OF NEW JERSEY.

MINE CAR.

Application filed January 14, 1926. Serial No. 81,255.

In the drawings:

Fig. 1 is a top plan view of a mine car constructed in accordance with this invention, parts being removed to show other parts more clearly;

Fig. 2 is a view partly in side elevation and partly in vertical section taken on the line 2—2 of Fig. 1, one wheel being removed to show a journal box more clearly;

Fig. 3 is an end elevation, part of the bumper being broken away to show the door-locking means more clearly;

Figure 8:
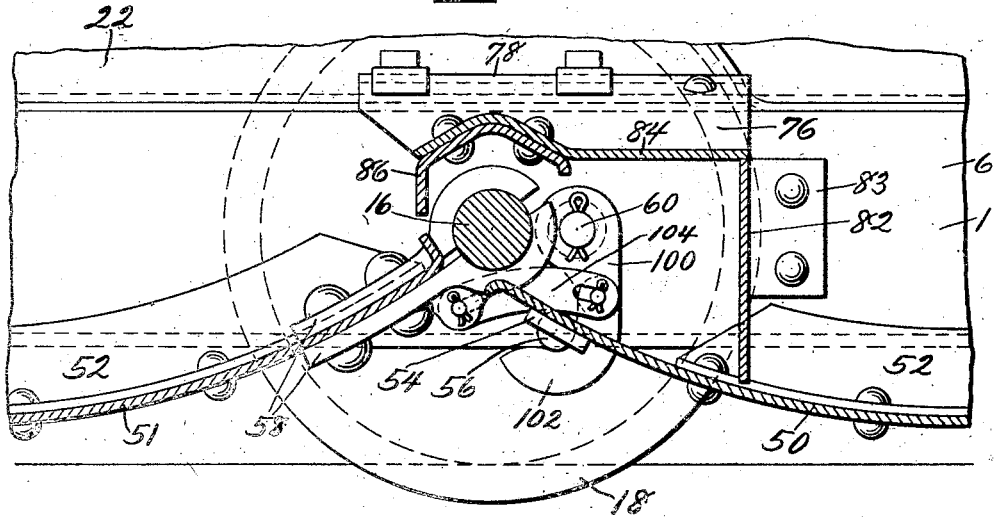
Figure 9:
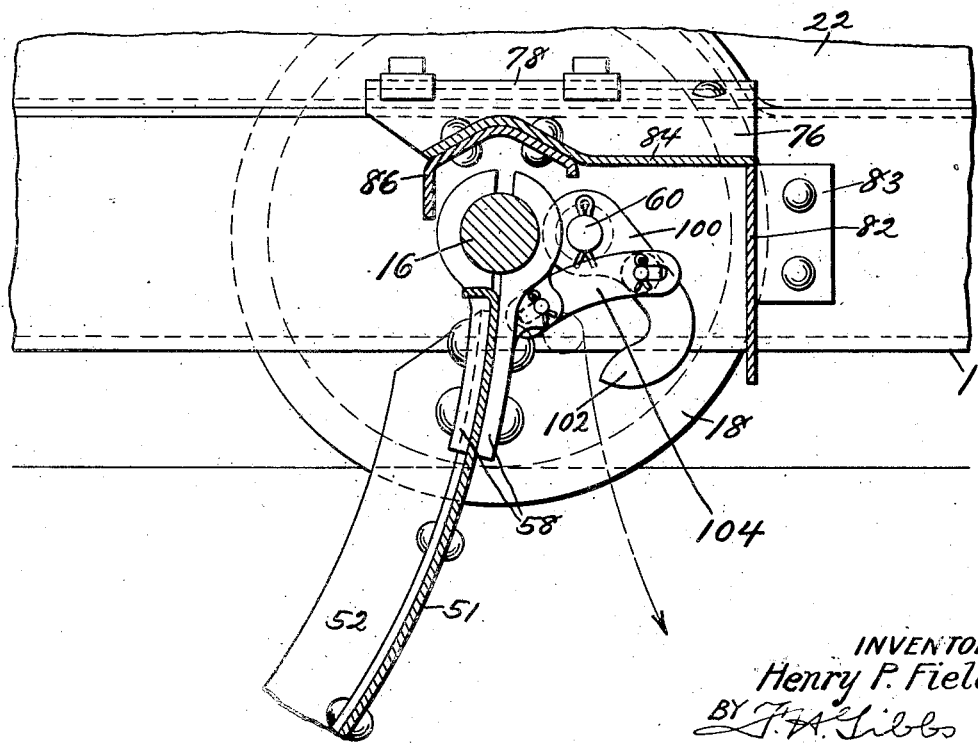

Figs. 4 and 5 are vertical sections taken on the lines 4—4 and 5—5, respectively, of Fig. 1;

Fig. 6 is a partial longitudinal vertical section taken through the hinge end of one of the doors and showing the door in the dropped position and the lock of the adjacent door operated to door-releasing position;

Fig. 7 is a partial top plan view showing one side of the hinge edge of one of the doors, parts being removed to show the door hinge structure more clearly;

Figs. 8 and 9 are vertical sections, similar to Fig. 6, of a modified construction, the doors being shown closed with the lock in door-retaining position in Fig. 8 and the door being shown open with the lock in door releasing position in Fig. 9;

Fig. 10 is a view similar to Fig. 6 showing another modification;

Fig. 11 is a top plan view similar to Fig. 7 of the structure shown in Fig. 10;

Fig. 12 is a partial transverse vertical section taken on the line 12—12 of Fig. 10, and Fig. 13 is a view similar to Fig. 6 showing the modification of Fig. 10 with the door dropped to open position and the lock operated to door releasing position.

This invention relates to mine cars of the type having floors composed of dumping doors so arranged that the dumping operation of one door automatically controls the dumping operation of an adjacent door and the return of one door to its normal position automatically locks an adjacent door in its normal position and it is an object of this invention to provide an improved locking means to be operated by the opening and closing movement of one door of a car of the type described to release and lock, respectively, an adjacent door of the car.

In the drawings the invention is shown applied to a mine car having longitudinal sills 1 connected at their ends by end sills 3 secured thereto by angles 4, both the longitudinal and the end sills being of channel shape and having their webs vertical and their flanges projecting outwardly. Engaging the outer faces of the webs 6 of the longitudinal sills 1 are journal boxes 8 having flanges 10 whereby they are secured to the upper and lower flanges 12 and 14, respectively, of the longitudinal sills 1. The journal boxes 8 are provided with openings alined with openings in the webs 6 of the sills 1 and receive therein the axles 15 and 16 having wheels 18 thereon. The upper flanges 12 of the sills 1 project upwardly and outwardly and have secured thereto plates 22 which are bent to form the side floors 24 and the sides 26, the side floors 24 extending upwardly and outwardly and being bent upwardly at their centers providing raised portions 28 which form hoods over the wheels 18. At their ends the side floors 24 and sides 26 are joined by end sheets 30 which are secured thereto by flanges 32 and which project downwardly between the sills 1 and are spaced inwardly from the end sills 3 a short distance.

The end sills 3 are provided with triangular-shaped bumper blocks 34 which extend from end to end of the sills 3 and are protected by wear plates 36 and 38. The bumper blocks are secured in position in the sills 3 by plates 40 which are secured to the bumper blocks 34, to the upper flanges of the end sills 3 and to the upper flanges 12 of the longitudinal sills 1, the flanges 12 being bent to a horizontal position at their ends in order to receive the plates 40. The plates 40 are also connected to the end reinforcing members 42 and aid in securing the end plates 30 in position. To the end sills are also secured the usual coupling members 44.

Mounted in the webs 6 of the longitudinal sills 1 adjacent one of the end sills 3 is a rod 46 to which hinge straps 48 pivotally secure a curved door 50 which has its free edge adjacent the axle 16. The door 50 is reinforced at its sides by angles 52 and has secured thereto, adjacent its free edge, members 54 provided with cylindrical portions 56 forming lugs which project laterally from the doors 50 but which lie within the longitudinal sills 1.

Upon the axles 15 and 16 divided hinge straps 58 pivotally secure similar doors 53 and 51, respectively, the door 51 having its free end adjacent the axle 15 while the door 53 has its free end adjacent the other end sill 3. Pivotally mounted on studs 60 secured to the webs 6 of the longitudinal sills 1 adjacent the axles 15 and 16 are locks or latches 62 having openings at their centers to engage with the studs 60 and having hook-shape portions 64 which project below the sills 1. The other ends of the latches 62 are pivotally connected to ends of links 66, the other ends of which have pin and slot connections with lugs 68 formed integral with the hinge straps 58. The door 51 is provided with members 54 having cylindrical portions 56 as is the door 50 and the portions 56 on both doors are engaged by the locks 62 in the same manner, the doors being cut away at the corners of their free edges, forming openings to receive the latches 62. The door 53 is provided at its free edge with lugs 70 which project beyond the free edge of the door into the corner openings and are engaged by the locking members 72 pivotally mounted on the end 30 at 73 and provided with arms 74 which project outwardly and downwardly and are engaged by an operating cam (not shown) which is positioned on the track as in Patent No. 1,534,135, Nichols, April 21, 1925.

The latches 62 are provided with covers or hoods comprising angle-shaped plate members 76 (Fig. 5) having flanges 78 which are secured to the upper flanges 12 of the longitudinal sills 1 and downwardly projecting flanges 80 to which are secured the bent plates 82 which project downwardly from the plate 76 and are connected to the webs 6 of the sills 1 by rivets through flanges 83. The horizontal portions 84 of the plates 76 have axle hood portions bent to an angular shape and have tie members 86, of inverted channel shape, secured thereto at their ends and extending across the body of the car, thereby bracing the sills and the body structure thereabove.

In the modification shown in Figs. 8 and 9 the locks or latches 100 are pivotally mounted at one end upon studs 60 carried by the webs 6 of the longitudinal sills 1 and have their other ends shaped to form hooks 102 which engage the laterally projecting lugs 56 on the members 54 secured to the door. The door 51 is pivotally connected by divided hinge straps 58 to the axle 16 and the hinge straps are provided with lugs to which are connected links 104 having pivotal connection with the latches 100 intermediate their ends, the links having pin and slot connections with both the lugs and the latches 100. It will be noted that this construction differs from the construction shown in Figs. 1 to 6, inclusive, in that the latch is turned and is operated in the opposite directions to release and engage the lugs 56 on the doors 50.

In the modified construction shown in Figs. 10 to 13, inclusive, the locking members or latches 110 are pivotally mounted on studs 60 carried by the webs 6 of the longitudinal sills 1. The locking members 110 are provided with curved projecting flanges 112 which engage with the lugs 56 on the members 54 on the door 50 and gear teeth 114 which mesh with teeth 116 formed integral with one portion of the divided hinge straps 58 which pivotally connect the door 51 to the axle 16.

In the operation of the device as illustrated in Figs. 1 to 7, inclusive, assuming the doors closed and the car moving towards the right, the locking means for the rear door 53 will be operated by the arm 74 (shown in Fig. 3) engaging the operating cam at the side of the track, releasing the lock 72 from the lugs 70, permitting the door 53 to drop and operate the latch 62 by means of the link 66, withdrawing the hook portion 64 from beneath the laterally projecting lugs 56 and permitting the door 51 to drop. The door 51 when dropped will, in turn, withdraw the latch 62 from beneath the lugs 56 on the door 50 permitting the door 50 to drop. As the car continues its movement to the right the door 50 is first raised by a means as shown in the patent mentioned above. Thereafter the door 51 is raised, operating the latch 62 to bring the hook portion 64 beneath the lugs 56 on the door 50 and locking the door 50 in place. The door 53 is thereafter raised bringing the latch 62 beneath lugs 56 of the door 51 and locking the door 51 in place, the door 53 being locked in place by the engagement of the lugs 70 with the locks 72, the locks 72 being returned to their engaging position by gravity.

In both opening and closing movements, however, the doors 50, 51, 53 swing independently of the latches except as the latches are affected by their link connections to the door hinges. Each door 50, 51, 53 is mounted and supported independently of the latches that secure the adjacent door. The hoods or covers 76 and 86 not only interconnect the car sides and protect the latches 62, axles 15, 16 and hinges 58, but also overlie the junctions between adjacent doors 50, 51, 53 and exclude the contents of the car from them, and from the latch openings at the corners of the doors.

In the modified construction shown in Figs. 8 and 9 the latch 100 is operated as described in connection with Figs. 1 to 6, except that the latch 100 is pivoted so as to be operated in the opposite directions. In the modified construction shown in Figs. 10 to 13 the lock 110 is operated by the raising and dropping of the door to engage and disengage the curved flange 112 with the lug 56 in the manner described in connection with Figs. 1 to 6.

What is claimed is:

1. In a mine car, a plurality of successively operating drop doors, projecting lugs on some of said doors, pivotally mounted latches for engaging said lugs to hold said doors closed and means operatively connecting said latches to others of said doors whereby said latches are operated by the opening of said other doors.

2. In a mine car, a plurality of successively operating drop doors, laterally projecting lugs on some of said doors adjacent the free edges thereof, latches pivotally mounted for engaging said lugs to hold said doors closed and connections between said latches and others of said doors whereby said latches are withdrawn by the dropping of said other doors.

3. In a mine car, a drop door, lugs projecting from the sides of said door, latches pivotally mounted for engaging said lugs, a second door, hinges pivotally supporting said second door and connections between said hinges and latches whereby said latches are positively operated by movements of said second door in both directions.

4. In a mine car, longitudinal sills, a drop door, laterally projecting lugs on said door, latches pivotally mounted on the car sills for engaging said lugs, a second door, hinges pivotally supporting said second door and connections between said hinges and latches whereby said latches are withdrawn to release said lugs as said second door drops.

5. In a mine car, a drop door, laterally projecting lugs on said door, pivotally mounted latches for engaging said lugs to hold said door closed, a second door, hinges pivotally supporting said second door and connections between said hinges and latches whereby said latches are rotated on their supports to release said lugs when said second door drops.

6. In a mine car, a drop door, latches for supporting said door in closed position, a second door mounted independently of said latches and connections between said second door and said latches for positively withdrawing said latches as said second door drops.

7. In a mine car, a drop door, latches for supporting said door in closed position, a second door mounted independently of said latches and connections whereby said second door positively operates said latches.

8. In a mine car, a drop door, latches for supporting said door in closed position, a second door mounted independently of said latches and having connections therewith causing said second door to positively withdraw said latches from said first door when dropped and return said latches when raised.

9. In a mine car, a drop door, pivotally mounted latches for supporting said door in closed position, a second door mounted independently of said latches and connections between said second door and latches to operate said latches as said second door is operated.

10. In a mine car, longitudinal sills, a drop door, laterally projecting lugs on said door adjacent the free edge thereof, latches pivotally mounted on said sills for engaging said lugs, a second door pivotally mounted adjacent said latches and connections between said second door and said latches whereby said latches are withdrawn from and engaged with said first door by the opening and closing of said second door.

11. In a mine car, a drop door, latches for holding said door closed, and a second door linked to said latches.

12. In a mine car, a drop door, pivoted latches for supporting said door in closed position, a second door mounted to swing independently of said latches, and links connecting said second door to said latches.

13. In a mine car, a drop door, pivoted latches for holding said door closed, a second door with hinges pivotally supporting it, and links connecting said hinges and latches.

14. In a mine car, the combination with an axle and a drop door adjacent thereto, of latches for holding said door closed, and a hood over said axle, said hood having enlarged ends covering said latches.

15. In a mine car, the combination with adjacent drop doors, of securing latches for one of them connected by links to the other, and a hood over the junction between said doors and over said latches.

16. In a mine car, the combination of an axle and a drop door hinged thereon, a second drop door, securing latches for one of said doors operated by the other, and a hood over axle, hinges and latches.

17. In a mine car, the combination of an axle, a drop door adjacent thereto, securing latches for said drop door at either side of the car, hoods over said latches, and a hood extending between said latch hoods over said axle.

18. In a mine car, the combination of an axle, a drop door adjacent thereto, securing latches for said drop door at either side of the car, and a hood interconnecting the car sides over said axle, with hoods over said latches at either end of said axle hood.

19. In a car, a pivotally mounted door having is free edge cut away forming openings at the corners, lugs carried by said door and projecting in the openings, latches engaging said lugs, and a hood covering said latches and openings.

20. In a mine car, the combination of an axle, a drop door adjacent thereto, securing latches for said drop door, a hood extending over said axle, and hoods projecting from said axle hood and covering said latches.

In witness whereof I have hereunto set my hand.

HENRY P. FIELD.